United States Patent
Caffrey

(10) Patent No.: US 7,514,695 B2
(45) Date of Patent: Apr. 7, 2009

(54) DETECTOR AND METHOD FOR INSPECTING A SEALED NUCLEAR STORAGE CONTAINER

(75) Inventor: Augustine J. Caffrey, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 65 days.

(21) Appl. No.: 11/535,084

(22) Filed: Sep. 26, 2006

(65) Prior Publication Data

US 2008/0123808 A1  May 29, 2008

(51) Int. Cl.
*G01J 1/42* (2006.01)
*G01T 1/00* (2006.01)

(52) U.S. Cl. .................................................... 250/393
(58) Field of Classification Search .............. 340/555, 340/566, 568, 600; 356/73.1; 385/140; 250/393
See application file for complete search history.

(56) References Cited

U.S. PATENT DOCUMENTS

| | | | | |
|---|---|---|---|---|
| 3,787,697 A * | 1/1974 | Shields | .................. | 250/370.04 |
| 4,068,306 A | 1/1978 | Chen et al. | | |
| 4,389,568 A * | 6/1983 | Dowdy et al. | ............... | 250/362 |
| 4,523,186 A * | 6/1985 | Fiarman | ...................... | 340/555 |
| 4,606,004 A | 8/1986 | Crawford et al. | | |
| 4,953,192 A | 8/1990 | Plewes | | |
| 4,962,315 A * | 10/1990 | Kawasaki et al. | ......... | 250/336.1 |
| 5,638,420 A | 6/1997 | Armistead | | |
| 5,665,970 A | 9/1997 | Kronenberg et al. | | |
| 5,754,617 A | 5/1998 | Itoh | | |
| 6,002,501 A * | 12/1999 | Smith et al. | ..................... | 398/9 |
| 6,457,858 B1 | 10/2002 | Nakamura et al. | | |
| 6,480,563 B2 | 11/2002 | Hoffman et al. | | |
| 6,624,425 B2 * | 9/2003 | Nisius et al. | ................ | 250/393 |
| 6,633,625 B2 | 10/2003 | Jackson et al. | | |
| 7,054,408 B2 | 5/2006 | Jiang et al. | | |
| 2003/0034456 A1 | 2/2003 | McGregor | | |
| 2004/0109532 A1 | 6/2004 | Ford et al. | | |
| 2005/0157844 A1 | 7/2005 | Bernardi et al. | | |
| 2006/0008047 A1 | 1/2006 | Zhou et al. | | |
| 2007/0245809 A1 | 10/2007 | Harmon et al. | | |

OTHER PUBLICATIONS

Ziock et al., "Radiation imaging of Dry-Storage Casks for Spent Nuclear Fuel," 2005 IEEE, Nuclear Science Symposium Conference Record, pp. 1163-1167.*

* cited by examiner

*Primary Examiner*—David P Porta
*Assistant Examiner*—Kiho Kim
(74) *Attorney, Agent, or Firm*—Trask Britt, PC

(57) ABSTRACT

A detector and methodology for inspecting a sealed nuclear storage container is described. The detector includes a collimated gamma-ray radiation detector which is moveably borne over the sealed nuclear storage container, and which detects gamma-ray radiation which is emitted by each of a plurality of spent nuclear fuel sources which are enclosed within the sealed nuclear storage container for purposes of detecting the illicit or unauthorized removal of spent nuclear fuel from the nuclear storage container.

21 Claims, 6 Drawing Sheets

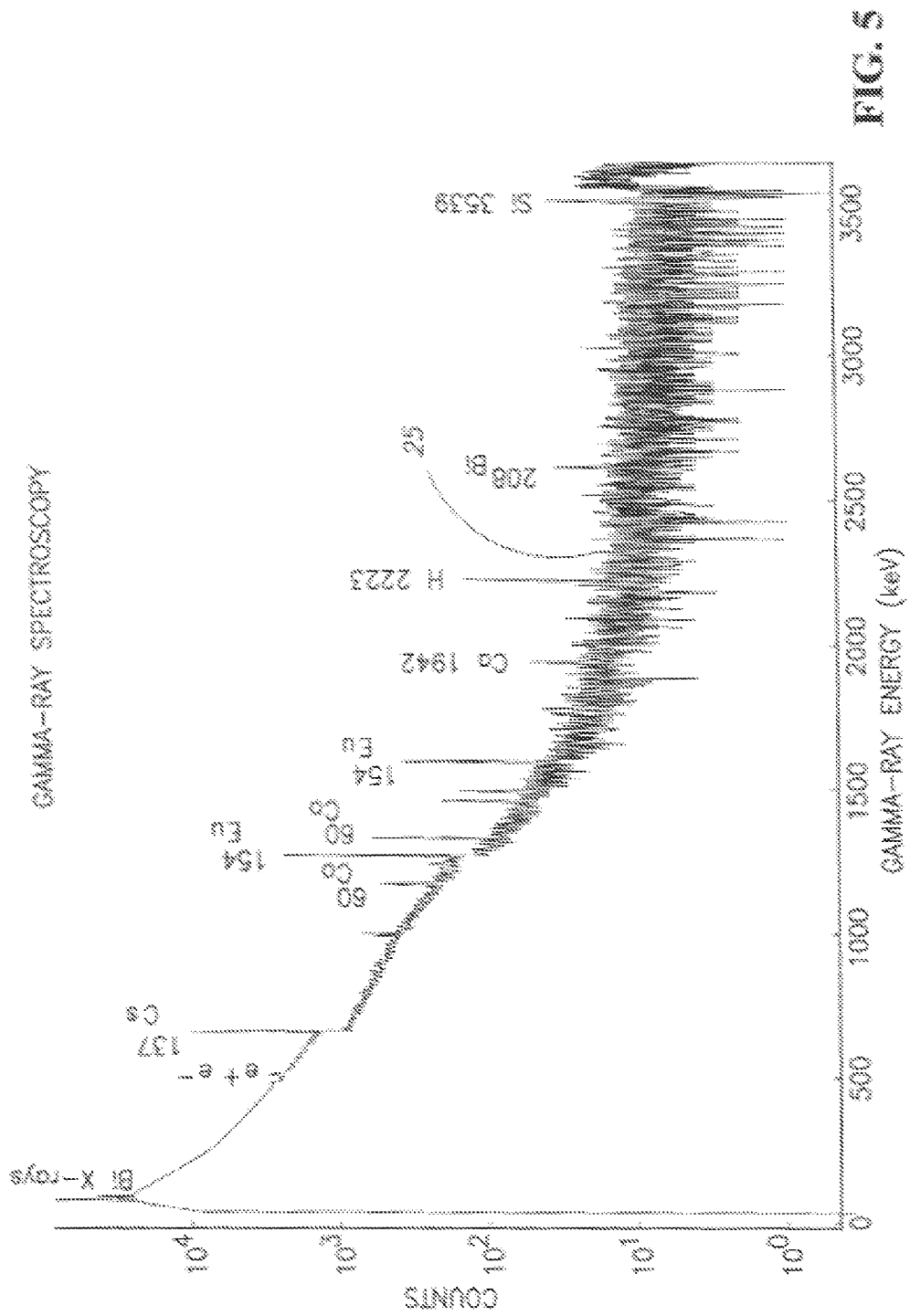

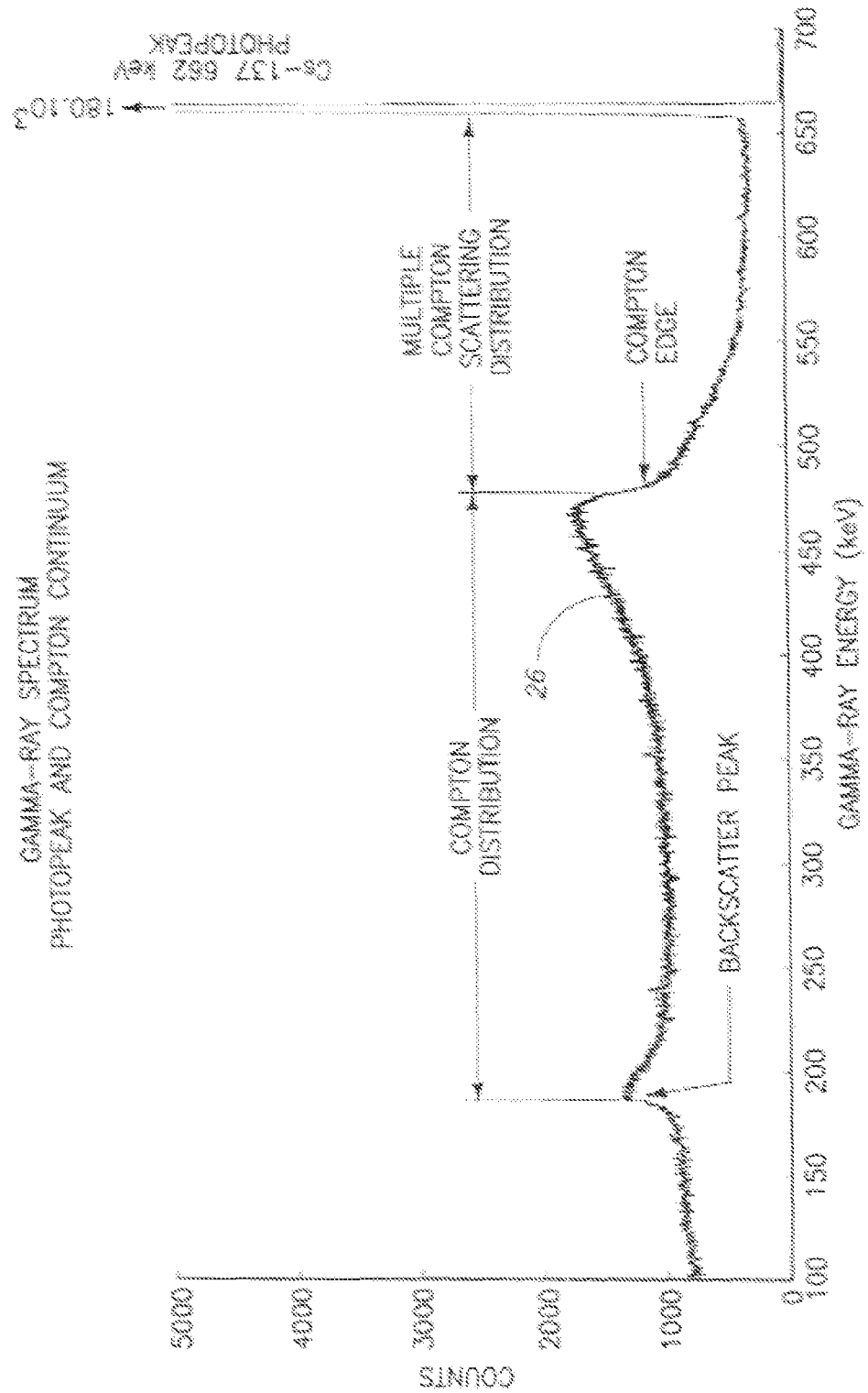

DETECTOR AND METHOD FOR INSPECTING A SEALED NUCLEAR STORAGE CONTAINER

GOVERNMENT RIGHTS

The United States Government has certain rights in this invention pursuant to Contract No. DE-AC07-05ID14517 between the United States Department of Energy and Battelle Energy Alliance, LLC.

CROSS-REFERENCE TO RELATED APPLICATIONS

This application is related to application Ser. No. 11/379,888, filed Apr. 24, 2006, entitled "APPARATUS AND METHOD FOR INSPECTING A SEALED CONTAINER," pending.

TECHNICAL FIELD

The present invention relates to a detector and method for inspecting a sealed nuclear storage container, and more specifically to a collimated gamma-ray radiation detector which is moveably borne by the sealed nuclear storage container, and which detects gamma radiation which is emitted by a plurality of spent nuclear fuel sources which is enclosed within the sealed nuclear storage container.

BACKGROUND OF THE INVENTION

Heretofore, spent nuclear fuel has been placed in fuel storage casks which are typically stored above ground, at various locations in the continental United States. These storage areas are typically in restricted areas, and security is provided to protect the casks from possible tampering or the removal of any spent nuclear fuel. At present, the only indication of possible reactor spent fuel diversion from a storage cask is provided by means of tamper-indicating tags and seals which are provided with each of the storage casks.

With the increasing risk of terrorist acts within the United States, and the possibility that spent nuclear fuel sources might by sought after and diverted for possible terrorist acts, a renewed effort has been undertaken to identify means by which spent nuclear fuel storage casks may be readily inspected to determine whether spent nuclear fuel which has been stored within same has been removed improperly from the storage cask.

SUMMARY OF THE INVENTION

A first aspect of the present invention relates to a detector for inspecting a sealed nuclear storage container, and which includes a gamma-ray radiation detector which is moveably borne by the sealed nuclear storage container, and which detects gamma-ray radiation which is emitted by a plurality of spent nuclear fuel sources which are enclosed within the sealed nuclear storage container for purposes of detecting the removal of spent nuclear fuel from the nuclear storage container.

Another aspect of the present invention relates to a detector for inspecting a sealed nuclear storage container which includes a sealed nuclear storage container having opposite ends, and further defining an internal cavity which has a plurality of discrete storage locations for individual spent nuclear fuel sources; a gamma-ray energy detector moveably borne on one end of the sealed nuclear storage container, and which detects gamma-ray radiation which is emitted by the plurality of spent nuclear fuel sources; a drive assembly which is borne by the frame, and which moveably positions the gamma-ray radiation detector in predetermined locations relative to the discrete storage locations; and a collimator operably coupled with the gamma ray energy detector, and which facilitates the detection of gamma-ray radiation which is emitted from the individual storage locations.

Still further, the present invention relates to a method for inspecting a sealed nuclear storage container, and which includes the steps of providing a sealed nuclear storage container having opposite ends, and an internal cavity, and which encloses a plurality of spent nuclear fuel in predetermined storage locations within the internal cavity; providing a gamma-ray energy detector which produces an electrical output when exposed to gamma-ray radiation; positioning the gamma-ray energy detector at one end of the nuclear storage container, and moving the gamma-ray energy detector into detecting relation relative to each of the storage locations; generating a gamma-ray spectrum for each of the storage locations of the nuclear storage container from the electrical output of the gamma-ray energy detector; and analyzing each of the gamma-ray spectra to determine the presence or absence of spent nuclear fuel at each of the storage locations of the sealed nuclear storage container.

Moreover, the present invention relates to a method for inspecting a sealed nuclear storage container which includes the steps of providing a sealed nuclear storage container which has opposite ends, and which further has an internal cavity which defines a plurality of spaced storage positions which receive individual spent nuclear fuel, and wherein the spent nuclear fuel generates gamma-ray radiation; providing a frame and mounting the frame on one of the ends of the sealed nuclear storage container; providing a selectively movable gantry which is moveably supported on the frame; providing a gamma-ray energy detector and mounting the gamma-ray energy detector on the movable gantry, and in spaced relation relative to one of the ends of the sealed nuclear storage container, and wherein the gamma-ray energy detector generates an electrical signal when exposed to gamma-ray radiation which is emitted from each of the storage locations; providing a drive assembly which is drivingly coupled to both the movable gantry and the gamma ray energy detector, wherein the drive assembly selectively moves the gamma-ray energy detector along the moveable gantry, and the moveable gantry along the frame to position the gamma-ray energy detector in sensing relation relative to each of the storage positions of the sealed nuclear storage container; providing a controller which is controllably coupled to the drive assembly and which facilitates the positioning of the gamma-ray energy detector in sensing relation relative to each of the storage positions of the sealed nuclear storage container; providing a collimator and coupling the collimator to the gamma ray energy detector; providing a multichannel analyzer and coupling the multichannel analyzer to the electrical signal output of the gamma-ray energy detector, and wherein the multichannel analyzer generates a gamma-ray spectrum from the electrical signal provided by the gamma-ray energy detector for each of the storage locations of the sealed nuclear storage container; and providing a gamma-ray spectrum analyzer which receives the respective gamma-ray spectra, and which confirms the presence or absence of spent nuclear fuel at each of the storage locations of the sealed nuclear storage container.

Still another aspect of the present invention relates to the verification and tracking for each spent fuel bundle by comparing a measured gamma-ray spectra of the spent fuel bundle with a known gamma-ray spectra for that spent fuel bundle.

These and other aspects of the present invention will be described in greater detail hereinafter.

BRIEF DESCRIPTION OF THE DRAWINGS

Preferred embodiments of the invention are described below with reference to the following accompanying drawings.

FIG. 5 is a graphical depiction of a gamma-ray spectrum which is produced in accordance with the teachings of the present invention.

FIG. 6 is a graphical depiction of a second gamma-ray spectrum showing a photopeak and Compton continuum in a gamma-ray spectrum and which is produced as a feature of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
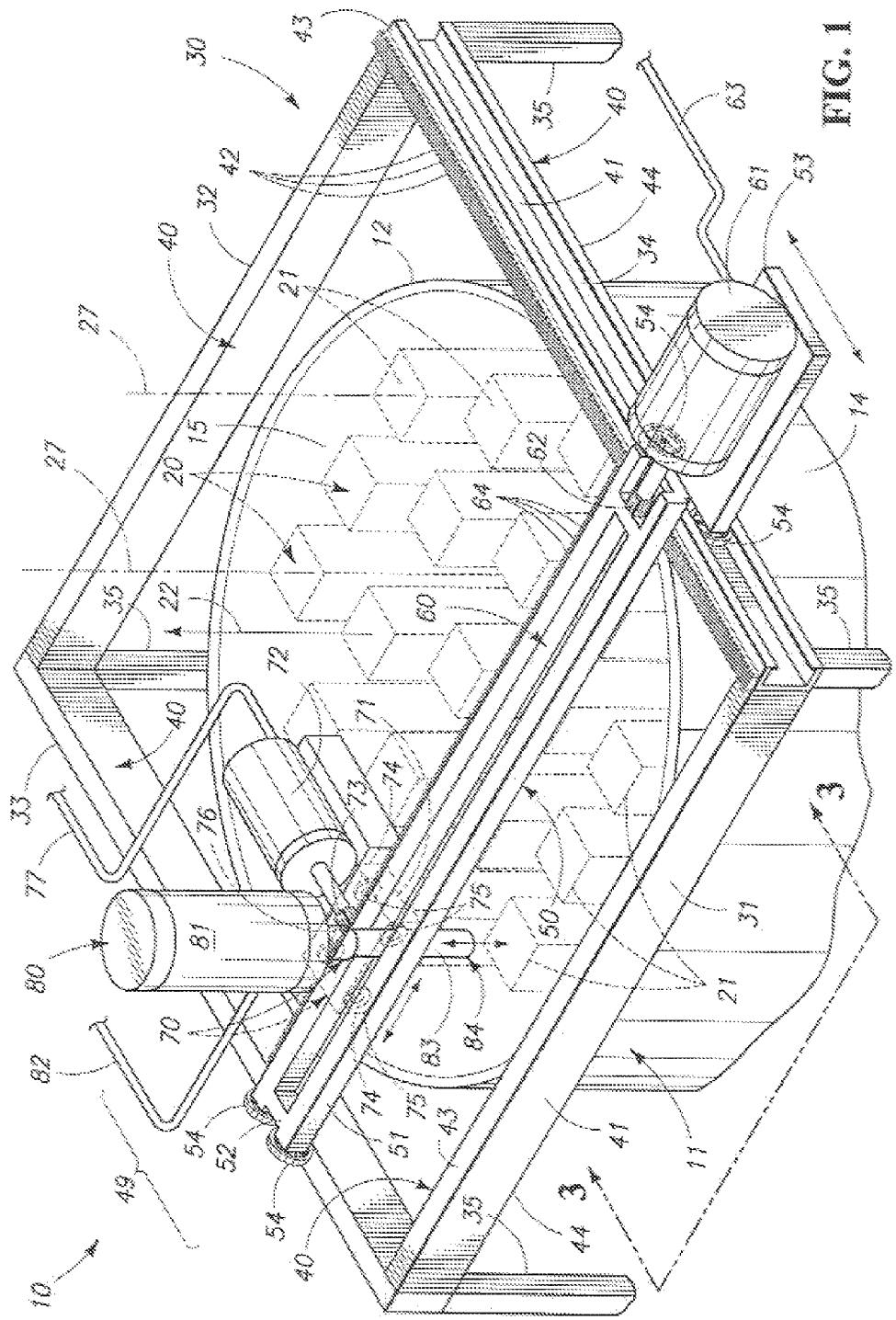
FIG. 1 is a fragmentary, greatly simplified depiction of the detector for inspecting a sealed nuclear storage container of the present invention.
Figure 2:
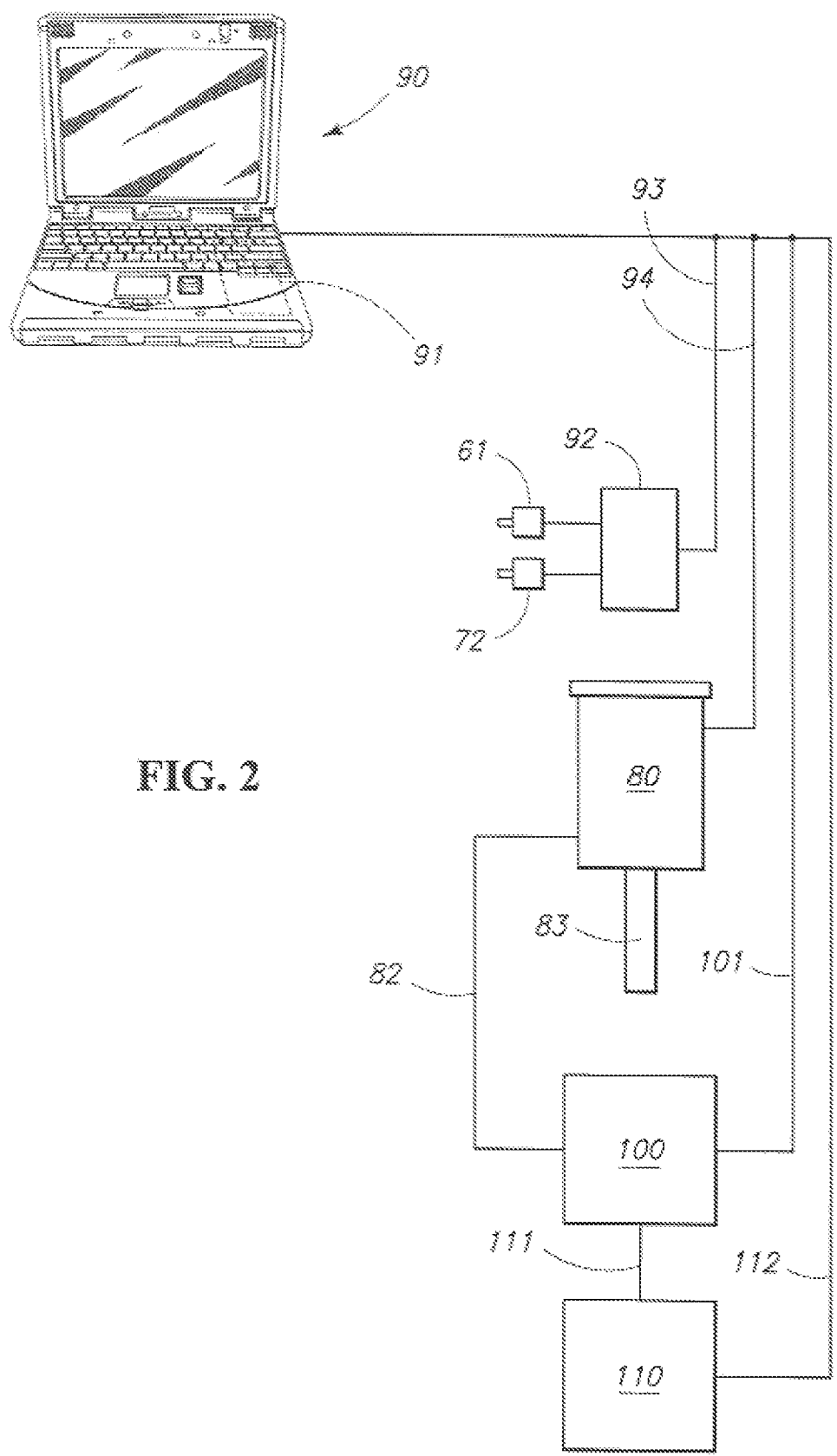
FIG. 2 is a greatly simplified schematic view of a control system which constitutes a feature of the present invention.
Figure 3:
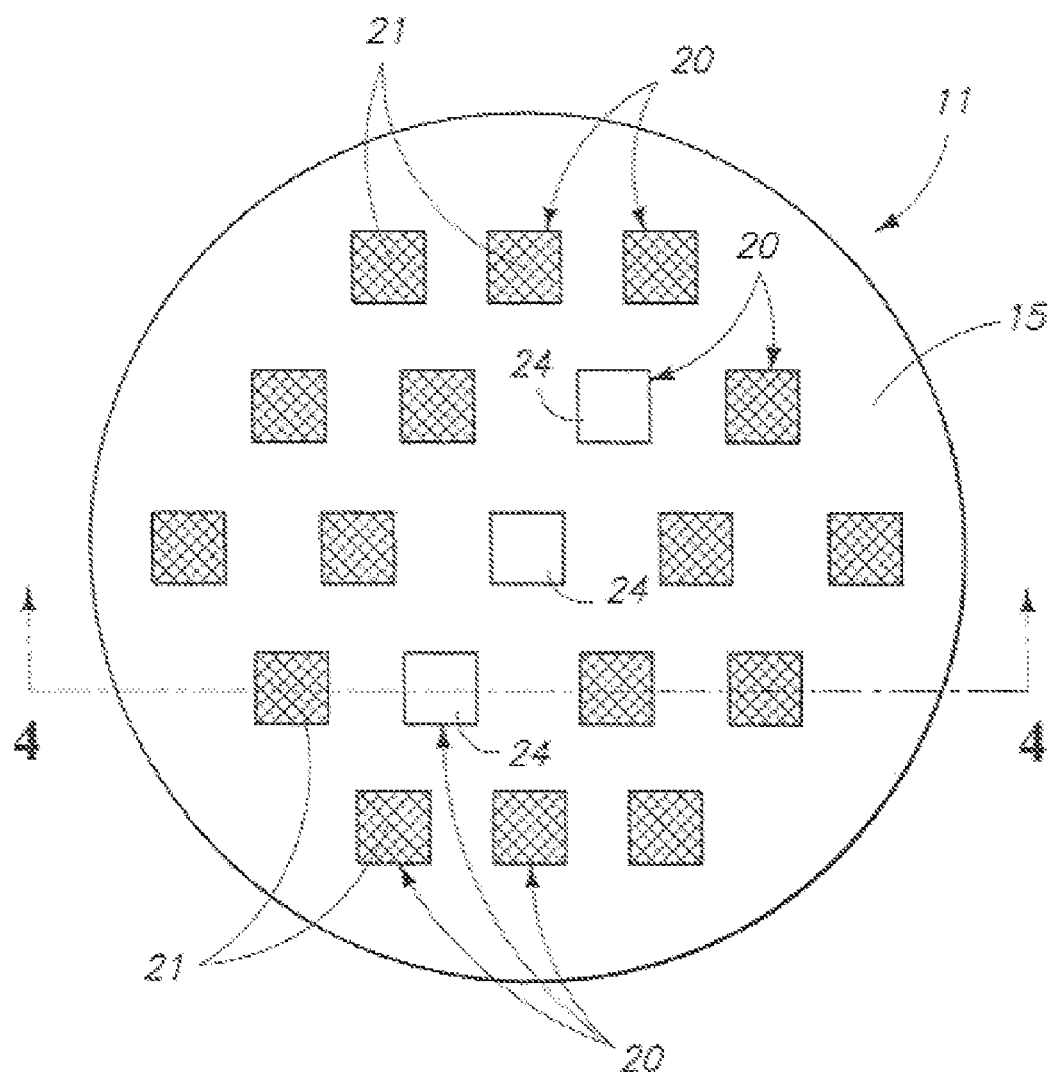
FIG. 3 is a substantially horizontal, sectional view which is taken from a position along line 3-3 of FIG. 1.
Figure 4:
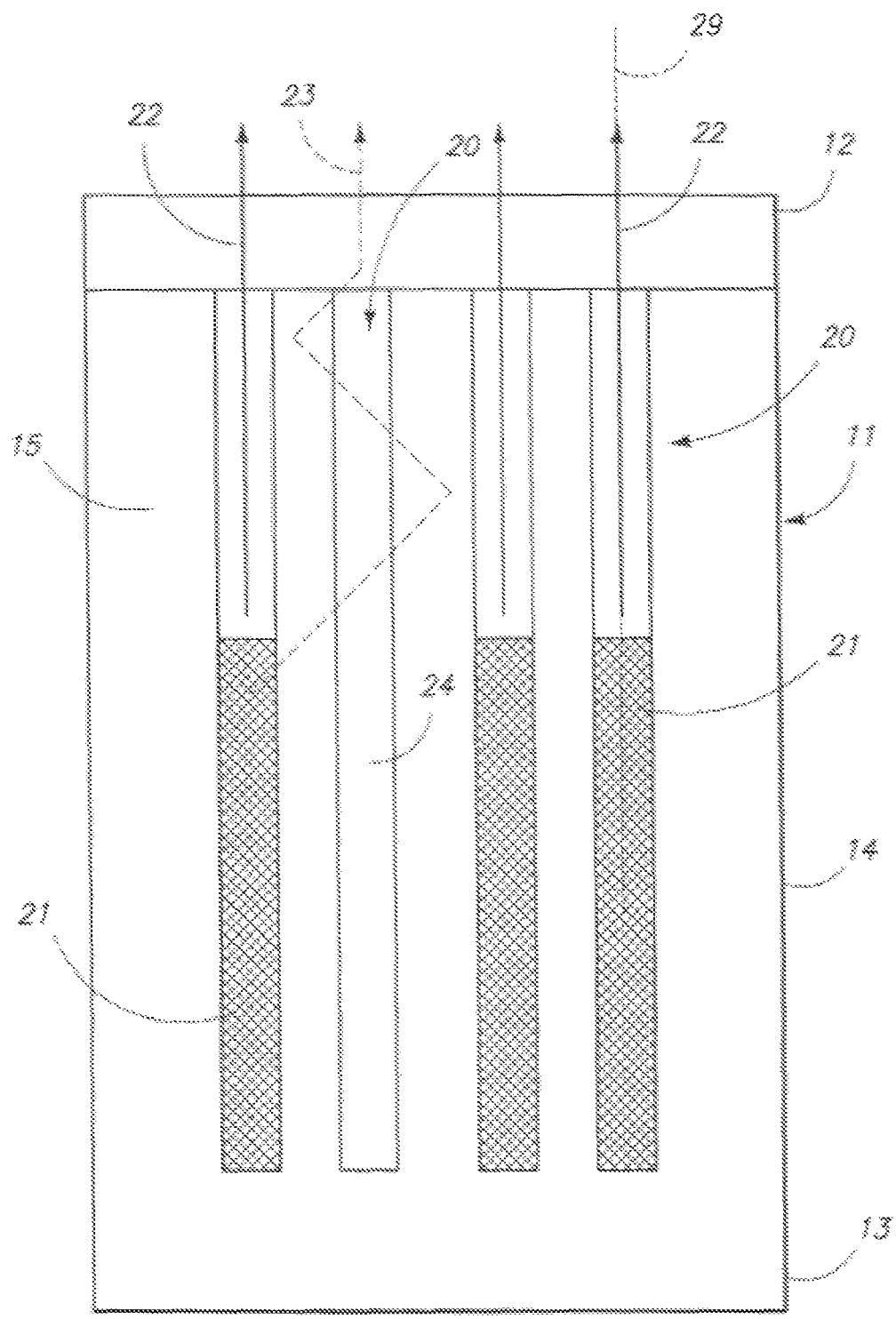
FIG. 4 is a longitudinal, transverse, vertical sectional view taken from a position along line 4-4 of FIG. 3.

A detector and method for inspecting a sealed nuclear storage container is best understood by a study of FIGS. 1-4, respectively. As seen therein, the detector 10 is useful for inspecting a sealed nuclear storage container generally indicated by the numeral 11. The sealed nuclear storage container has a sealed, first end 12; an opposite second end 13; a substantially continuous sidewall 14; and an internal cavity 15, which is defined by the sidewall 14. As seen in FIG. 3, the internal cavity 15 defines a plurality of storage positions 20 which are operable to individually position a plurality of spent nuclear fuel sources 21 in given predetermined spaced relation relative to each other. As seen in FIG. 4, the respective spent nuclear fuel sources 21 each generate direct gamma-ray radiation generally indicated by the numeral 22; and scattered gamma-ray radiation generally indicated by the line labeled 23. As seen in FIG. 3, several of the storage positions 20 have no spent nuclear fuel positioned in same. These are indicated by the numeral 24. As should be understood, the scattered gamma-ray radiation results from the passage of gamma-ray radiation into an adjacent empty storage space, and the reflection of same up through the storage space as illustrated in FIG. 4.

Referring now to FIG. 5, it will be seen that the direct gamma-ray radiation 22 emitted by the plurality of spent nuclear fuel sources 21 is here graphically depicted by the line labeled 25. The fission products produced by the respective spent nuclear fuel sources 21 are identified on that drawing. Referring now to FIG. 6, a gamma-ray spectrum showing the features of a photopeak and Compton continuum as might be depicted by means of scattered gamma-rays 23 which are emitted by the plurality of spent nuclear fuel sources 21 is generally indicated by the line labeled 26. The significance of this graphical depiction will be discussed in greater detail hereinafter.

Referring now to FIG. 1, the detector 10 for inspecting a sealed nuclear storage container 11 of the present invention includes a frame which is generally indicated by the numeral 30, and which is removably borne on or positioned near the first end 12 of the sealed nuclear storage container 11. The frame 30 moveably supports a collimated gamma-ray energy detector, as will be discussed in greater detail, hereinafter, for selective movement to a plurality of locations which are individually, substantially aligned with each of the spent nuclear fuel sources 21 which are received within the internal cavity 15 of the sealed nuclear storage container 11. In this regard, the frame 30 has first, second, third and fourth members which are generally indicated by the numerals 31, 32, 33 and 34, respectively and which are further joined together in a square or rectangular shape, and which are mounted in spaced, substantially parallel relation relative to the first end 12 of the sealed nuclear storage container 11. In the event the first end has a curved shape, then the frame members would be oriented in substantially perpendicular relation relative to the longitudinal axis of the sealed nuclear storage container 11.

The plurality of frame members 31-34 are held in spaced relation relative to the first end 12, by a plurality of posts 35 which may releasably engage the first end 12 or which further rests upon the surface of the earth. Still further, it should be understood that the respective frame members 31-34 have an inside facing surface 40 and an outside facing surface 41. As depicted in FIG. 1, at least one of the frame members, here depicted as 34, has a rack 42 attached thereto.

The rack 42 is operable to matingly cooperate with a pinion gear, as will be described hereinafter, and which facilitates the movement of an associated gantry which will be discussed, below, along the frame 30. As seen in FIG. 1, each of the frame members 31-34 has a top surface 43, and a bottom surface 44, respectively.

Referring still to FIG. 1, it will be seen that the present detector 10 for inspecting a sealed nuclear storage container 11 includes a drive assembly 49. The drive assembly further comprises a moveable gantry which is generally indicated by the numeral 50. As illustrated, the gantry 50 is selectively moveable to predetermined locations therealong the frame 30 in order to position a gamma-ray radiation detector, as will be described in greater detail hereinafter, for movement therealong. In this regard, the gantry 50 has a main body 51, which has a first end 52, and an opposite second end 53. The respective first and second ends 52 and 53 have a plurality of idler or engagement wheels 54 mounted thereon. The respective idler wheels are positioned in rolling engagement there against the top and/or bottom surfaces 43 and 44 of the opposite frame members 33 and 34, respectively. The plurality of idler wheels 54 render the gantry moveable along the respective frame members 33 and 34 for the purposes which will be described below. As seen in FIG. 1, the gantry 50 further defines a longitudinally extending channel 60 which is formed in the main body 51, and which is operable to moveably receive a portion of the gamma-ray radiation detector which will be described in the paragraphs below. Still further, and as seen in the drawings, and positioned on the second end 53 of the main body 51 is a first gantry drive motor which is generally indicated by the numeral 61.

The first gantry drive motor 61 has a pinion gear 62 mounted thereon, and which meshingly engages the rack 42. When the first gantry motor 61 is energized, the gantry 50 moves therealong the respective frame members 33 and 34 to given positions which are appropriate so as to allow the practice of the methodology of the present invention. As will be further appreciated from a study of FIG. 1, a second rack 64 is mounted on the main body 51 and is further useful for the purposes which are described hereinafter. The first gantry motor 61 is controlled by means of an electrical conduit which is only fragmentarily shown and identified by the numeral 63.

The gantry 50 has a moveable support member which is generally indicated by the numeral 70, which moves therealong the main body 51 between the first and second ends 52 and 53, respectively. The moveable support member 70 has a main body 71 which mounts a second gantry drive motor which is generally indicated by the numeral 72. The second gantry drive motor includes a pinion gear 73 which meshingly engages the second rack 64, and which is mounted on the main body 51 of the gantry 50. When energized, the second gantry drive motor 72 is operable to move the support member 70 to selected locations along the gantry 50, in order to position a gamma-ray radiation detector, as will be described below, in an appropriate location in sensing relation relative to the respective spent nuclear fuel sources 21. As seen in FIG. 1, the main body 71 includes a pair of spaced depending sidewalls 74. The pair of sidewalls each mount a plurality of idler or engagement wheels 75 which rollably engage the top and bottom surfaces of the gantry 50. As seen in FIG. 1, an aperture 76 is formed in the main body 71 and facilitates the appropriate orientation or positioning of the gamma-ray radiation detector as will be described in the paragraph below. As should be understood from the drawings, an electrical conduit 77 electrically couples the second gantry drive motor 72 to an appropriate engine controller which will be discussed, in greater detail hereinafter.

As seen in FIG. 1, the detector 10 for inspecting a sealed nuclear storage container 11 of the present invention includes a gamma-ray radiation detector which is generally indicated by the numeral 80. The gamma-ray radiation detector produces an electrical output comprising an electrical signal when exposed to gamma-ray radiation such as the direct gamma-ray radiation 22 or a scattered gamma-ray radiation 23 as seen in FIG. 4. The gamma-ray radiation detector 80 has a main body 81 which is mounted on the main body 71, and in substantially coaxial alignment relative to the aperture 76. The gamma-ray radiation detector 80 has an electrical conduit 82 which is coupled to same, and which conducts an electrical signal away from the gamma-ray radiation detector 80 for delivery to a multichannel analyzer which will be discussed in greater detail below. Still further, and as seen in FIG. 1, the gamma-ray radiation detector has a collimator 83 which extends therethrough the aperture 76, and through the longitudinally extending channel 60 which is defined by the gantry 50 so as to be positioned in spaced relation relative to the first end 12 of the sealed nuclear storage container 11. The collimator 83 which is operably coupled with the gamma-ray energy detector facilitates the detection of gamma-ray radiation 23 and 24 which are emitted from the individual storage positions 20 within the cavity 15 of the sealed nuclear storage container 11. The collimator, in effect, allows the gamma-ray radiation detector 80 to solely sample the gamma-ray radiation from the individual storage positions 20 without substantially detecting the gamma-ray radiation emitted from adjacent storage positions 20. The collimator 83 may be designed in various ways. Simply, it may include a structure such as a lead conduit which substantially directs the gamma-ray radiation to the detector 80 which is located endwardly thereof. The collimator defines a passageway 84 which extends therethrough, and which allows the emitted gamma-ray radiation to pass through to the gamma-ray radiation detector 80. As noted above, the gamma-ray radiation detector 80, when exposed to gamma-ray radiation, produces an electrical signal which is transmitted by way of the electrical conduit 82 to the assemblies discussed below.

Referring now to FIG. 2, it will be seen that the present invention includes a control system for managing the operation of the detector 10 for inspecting a sealed nuclear storage container 11. As seen in FIG. 2, the detector 10 includes a general purpose computer 90 having a memory 91 which renders the detector 10, and the methodology of the present invention operational. In this regard, the computer 90, through installed software, and programming, is operable to selectively control a motor controller which is generally indicated by the numeral 92. The computer 90 is electrically coupled to the motor controller 92 by means of a first electrical conduit 93. In this regard, it should be understood, that the computer 90 is operable to send commands to the motor controller 92 which is utilized to selectively energize and control the first gantry drive motor 61, and the second gantry drive motor 72 so as to appropriately position the gamma-ray radiation detector 80 in an appropriate orientation endwardly relative to each of the respective spent nuclear fuel sources 21, and substantially along the centerline 27 of each of the storage positions 20. Still further, and as illustrated in FIG. 2, a second electrical conduit 94 electrically couples the computer 90 in controlling relation relative to the gamma-ray radiation detector 80 so as to render it operational.

Still referring to FIG. 2, it will be seen that the present detector 10, and methodology for inspecting a sealed nuclear storage container 11 of the present invention includes a multichannel analyzer 100 which is electrically coupled and receives, by means of the electrical conduit 82, the electrical signal which is generated by the gamma-ray radiation detector 80 following the exposure of same to gamma-ray radiation 22 and 23. Still further, the multichannel analyzer 100 is controllably coupled by means of a third electrical conduit 101 to the computer 90. The multichannel analyzer 100 is further operable to produce the gamma-ray spectra such as seen by the lines labeled 25 and 26 in FIGS. 5 and 6, respectively, when the gamma-ray radiation detector 80 is moved into substantial coaxial alignment relative to the centerlines 27 of each of the storage positions 21. As should be understood, and in operation, the frame 30, and associated gantry 50 are operable to move the gamma-ray radiation detector 80 to each of the respective storage positions 20. Once in an appropriate location, and delayed for a period of time, the gamma-ray radiation detector 80 provides an electrical signal, which, when received by the multichannel analyzer 100, causes the generation of an appropriate spectrum such as seen in Figs. 5 and 6 for each of the given storage positions 20.thereafter, the computer 90 by means of the controller 92, and the respective first and second gantry drive motors 61 and 72, respectively, are collectively operably to index or otherwise move the gamma-ray radiation detector 80 to the next nuclear fuel storage position 20 where another gamma-ray spectrum such as seen in Figs. 5 and/or 6 is generated.

As seen in FIG. 2, the present invention further includes a gamma-ray spectrum analyzer 110 which is electrically coupled by means of an electrical conduit 111 to the multichannel analyzer 100. The gamma-ray spectrum analyzer 110 is operable to receive the gamma-ray spectra produced by the multichannel analyzer 100 and analyze same for purposes of determining the presence and/or absence of spent nuclear fuel at the given storage position 20 which is being inspected by the gamma-ray radiation detector 80. As seen in FIG. 2, a fourth electrical conduit 112 electrically couples the computer 90 with the gamma-ray spectrum analyzer 110. The fourth electrical conduit 112 is operable to conduct electrical signals between the two assemblies and is further operable to store information regarding the information provided by the gamma-ray spectrum analyzer in order to provide a unique identifier, or fingerprint, for the sealed nuclear storage container 11 which is undergoing inspection. In this regard, the gamma-ray spectrum analyzer 110 identifies a missing spent nuclear fuel source 21 by a gamma-ray spectrum which has an absent or weak photopeak as seen by the line labeled 26 as illustrated in FIG. 6. Still further, the gamma-ray spectrum analyzer 110 identifies a missing spent nuclear fuel source 21 by identifying a peak-to-Compton ratio of fission products gamma-rays from each of the gamma-ray spectra. In this regard, a high peak-to-Compton ratio indicates the presence of spent nuclear fuel at the storage location and a low peak to Compton ratio indicates the absence of a spent nuclear fuel source at the same location. As earlier indicated, the lines labeled 25 and 26 in FIGS. 5 and 6 show examples of the types of gamma-ray spectra produced by the present invention.

OPERATION

The operation of the described embodiment of the present invention is believed to be readily apparent and is briefly summarized at this point.

As seen by references to FIGS. 1-6, respectively, a detector 10 for inspecting a sealed nuclear storage container 11 broadly includes a gamma-ray radiation detector 80 which is moveably borne by the sealed nuclear storage container 11, and which detects gamma-ray radiation such as 22 and 23 which is emitted by a plurality of spent nuclear fuel sources 21 which are enclosed within the sealed nuclear storage container for purposes of detecting the removal of spent nuclear fuel from the nuclear storage container 11. As seen in FIG. 1, and following, the sealed nuclear storage container 11 has a first end 12, and an opposite second end 13, and further defines an internal cavity 15, and wherein the spent nuclear fuel sources 21 are positioned in predetermined spaced relation, one relative to the others, within the internal cavity 15. The gamma-ray radiation detector 80 individually collects the gamma-ray radiation 22 and 23 from the respective spent nuclear fuel sources 21 from at least one end of the sealed nuclear storage container 11. As seen in the drawings, the gamma-ray energy detector 80 produces an electrical output or signal when exposed to gamma-ray radiation 22 and 23 which is emitted from the respective spent nuclear fuel sources 21. The detector 10 of the present invention further comprises a multichannel analyzer 100 which is electrically coupled with the gamma-ray energy detector 80. The multichannel analyzer 100 generates a gamma-ray spectrum such as seen in FIGS. 5 and 6, and depicted as lines 25 and 26, from the electrical output or signal of the gamma-ray energy detector 80. Still further, the invention 10 includes a gamma-ray spectrum analyzer 110 which analyzes the gamma-ray spectrum to determine the presence and/or absence of the respective spent nuclear fuel sources 21 within the cavity 15 of the container 11.

In order to affect the foregoing, a detector 10 of the present invention further includes a frame 30 mounted on one end 12 of the nuclear storage container 11, and which moveably supports the gamma-ray energy detector 80 for selective movement relative to a plurality of storage positions 20. The detector 80 is substantially aligned with the centerline 27 of each of the spent nuclear fuel sources 21 which are received within the cavity 15 of the sealed nuclear storage container 11. Still further, the detector 10 of the present invention includes a drive assembly 49 which is borne by the frame, and which moves the gamma-ray energy detector 80 to each of the plurality of storage positions 20. The drive assembly 49 substantially aligns the gamma-ray energy detector 80 with each of the spent nuclear fuel sources 21. In the present arrangement, the gamma-ray spectrum analyzer 110 identifies a missing spent nuclear fuel source by a gamma ray spectrum (FIGS. 5 and 6) which has an absent and/or weak photopeak or further, identifies a peak-to-Compton ratio of fission product gamma rays from each of the gamma-ray spectra.

In the arrangement as seen in the drawings, the nuclear storage container 11 defines a plurality of storage positions 20 which receive the respective spent nuclear fuel sources 21 within the sealed nuclear storage container 11. In this regard, the detector 10 further includes a collimator 83 which is operably coupled with the gamma-ray energy detector 80, and which facilitates the collection of emitted gamma ray radiation 22 and 23 from the individual storage positions 20 within the sealed nuclear storage container 11. As earlier discussed, the multichannel analyzer 100 produces a gamma-ray spectrum, such as seen in FIGS. 5 and 6 for each of the storage positions 20 within the sealed nuclear storage container 11. In this regard, the plurality of gamma-ray spectra collectively identify the spent nuclear fuel contents of the sealed nuclear storage container 11. Additionally, the detection of neutron-captured gamma rays produced in the shielding and structural materials of the spent fuel container provide a separate measurement of the presence of spent fuel. Specifically, the captured gamma-rays confirm the presence of spontaneously fissioning isotopes such as plutonium-240 bred during reactor operation. This identification of the container 11 is kept within the memory 91, of the controlling computer 90. As earlier discussed, the controlling computer 90 is operable to controllably index the gamma-ray radiation detector 80 to each of the given storage positions 20 and to thereafter generate a gamma-ray spectrum which is analyzed for the presence or absence of spent nuclear fuel sources 21. Further, and as earlier discussed, the collimator 83 facilitates the analysis of one storage position 20 at a time. As should be understood, the drive assembly 49 positions the collimator 83 and the associated gamma-ray energy detector 80 in substantially coaxial alignment relative to the centerline 27 of each of the discrete storage locations or positions 20 as defined in the internal cavity 15 of the nuclear storage container 11. Still further, the drive assembly 49 positions the gamma-ray energy detector 80 along the centerline of each of the respective storage locations for a time period which facilitates the generation of a gamma-ray spectrum for each of the respective storage locations or positions 20.

The present invention is further directed to a method for inspecting a sealed nuclear storage container 11 which includes the step of providing a sealed nuclear storage container 11 which has opposite ends 12 and 13, and an internal cavity 15 which defines a plurality of spaced storage positions 20 which receive individual spent nuclear fuel sources 21.

In this regard, the spent nuclear fuel generates gamma-ray radiation as indicated by the lines labeled 22 and 23 and 25 and 26, as seen in the drawings. The methodology includes another step of providing a frame 30 and mounting the frame on or in spaced relation relative to one of the ends 12 of the sealed nuclear storage container 11. Still further, the method includes another step of providing a selectively movable gantry 50, and which is moveably supported on the frame 30. The methodology also includes a step of providing a gamma-ray energy detector 80, and mounting the gamma-ray energy detector on the movable gantry, and in spaced relation relative to one of the ends 12 of the nuclear storage container 11. In the arrangement as seen in FIG. 1, the gamma-ray energy detector 80 generates an electrical signal when exposed to gamma-ray radiation 22 and 23 which is emitted from the predetermined storage locations 20.

Still further, the methodology includes a step of providing a drive assembly 49 which is drivingly coupled to both the movable gantry 50 and the gamma ray energy detector 80. The drive assembly 49 further comprises, at least in part, first and second gantry drive motors 61 and 72, respectively which selectively move the gamma-ray energy detector 80 along the moveable gantry 50, and the moveable gantry 50 along the frame 30 to appropriately position the gamma-ray energy detector 80 in radiation sensing relation relative to each of the storage positions 20 of the nuclear storage container 11. The present method further includes another step of providing a controller 92 which is controllably coupled to the drive assembly 49, and which facilitates the positioning of the gamma-ray energy detector 80 in radiation sensing relation relative to each of the storage positions 20 of the nuclear storage container 11. The present methodology also includes another step of providing a collimator 83, and coupling the collimator to the gamma ray energy detector 80. Still further, the method includes another step of providing a multichannel analyzer 100, and coupling the multichannel analyzer 100 to the electrical signal output of the gamma-ray energy detector 80. The multichannel analyzer 100 as earlier discussed generates a gamma-ray spectrum such as seen by the lines labeled 25 and 26 in FIGS. 5 and 6 from the electrical signal provided by the gamma-ray energy detector 80 for each of the storage locations 20 of the nuclear storage container 11. Still further, the methodology includes another step of providing a gamma-ray spectrum analyzer 110 which receives the respective gamma-ray spectra as seen in FIGS. 5 and 6, and which confirms the presence or absence of spent nuclear fuel at each of the storage locations of the nuclear storage container utilizing the criteria as earlier disclosed.

Therefore the present apparatus provides a convenient detector and methodology for determining the presence or absence of spent nuclear fuel within sealed nuclear storage containers thereby providing an effective tool for policing and safe-guarding spent nuclear fuel which might be utilized for unlawful purposes.

The spectrum measured by the gamma-ray detector constitutes a unique "fingerprint" for each spent fuel bundle, to the extent that each bundle has a unique power history in the nuclear reactor. Hence, subsequent gamma-ray remeasurements of the spent fuel can confirm a match to known gamma-ray spectra for that particular fuel bundle, after correcting the gamma-ray peak intensities for decay of the relevant fission-product isotopes. This provides a methodology for tracking the shipment of spent fuel bundles.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A detection apparatus for inspecting a sealed storage container for nuclear fuel sources, comprising:
   a frame sized and configured for disposition in superimposition vertically above a sealed storage container for nuclear fuel sources;
   a gamma-ray energy detector supported on the frame for movement in a horizontal plane thereover and vertically oriented for detection of gamma-ray energy emitted by a plurality of spaced, discrete nuclear fuel sources enclosed within a sealed storage container over which the frame is to be disposed; and
   a collimator operably coupled to the gamma-ray energy detector for substantially limiting detection of gamma-ray energy by the gamma-ray energy detector to a gamma-ray energy emitted from a location in substantial vertically superimposed alignment therewith.

2. The detection apparatus of claim 1, further including a sealed storage container defining an internal cavity, wherein the nuclear fuel sources are located in a plurality of predetermined, mutually laterally spaced positions within the internal cavity, and wherein the gamma-ray energy detector is positioned above the sealed storage container to individually collect gamma-ray energy from the nuclear fuel sources located at the predetermined, mutually laterally spaced positions from an end of the sealed storage container.

3. The detection apparatus of claim 2, wherein the gamma-ray energy detector is adapted to produce an electrical output when exposed to gamma-ray energy, and wherein the detection apparatus further comprises:
   a multichannel analyzer electrically coupled with the gamma-ray energy detector, and adapted to produce a gamma-ray spectrum from the electrical output of the gamma-ray energy detector; and
   a gamma-ray spectrum analyzer electrically coupled with the multichannel analyzer for analyzing the gamma-ray spectrum to determine a presence or absence of a nuclear fuel source at the predetermined, mutually laterally spaced positions within the internal cavity.

4. The detection apparatus of claim 3, further comprising:
   a drive assembly borne by the frame for selectively moving the gamma-ray energy detector horizontally to a position substantially vertically superimposed over and in alignment with each of the plurality of predetermined, mutually laterally spaced positions for a nuclear fuel source within the internal cavity.

5. The detection apparatus of claim 4 further comprising a controller for controlling operation of the drive assembly for selective horizontal movement of the gamma-ray energy detector.

6. The detection apparatus of claim 3, wherein the gamma-ray spectrum analyzer is configured to identify a missing nuclear fuel source responsive to existence of a gamma-ray spectrum at a predetermined, mutually laterally spaced position which has an absent and/or weak photopeak.

7. The detection apparatus of claim 3, wherein the gamma-ray spectrum analyzer is configured to identify a missing nuclear fuel source at a predetermined, mutually laterally spaced position by identifying a peak-to-Compton ratio of fission product gamma rays from each among a plurality of gamma-ray spectra.

8. The detection apparatus of claim 3, wherein the sealed storage container defines a plurality of storage positions which receive the respective nuclear fuel sources within the sealed storage container, and wherein the multichannel analyzer produces a gamma-ray spectrum for each of the storage positions within the sealed storage container, and wherein a plurality of gamma-ray spectra collectively identify the nuclear fuel source contents of the sealed storage container.

9. An apparatus for inspecting a sealed storage container housing a plurality of nuclear fuel sources at a plurality of discrete storage locations therein, the apparatus comprising:

a gamma-ray energy detector supported for detection of nuclear fuel sources within a sealed storage container solely from an end thereof by detection of gamma-ray energy emitted by a nuclear fuel source within the sealed storage container;

a drive assembly for moveably positioning the gamma-ray energy detector in selective longitudinal alignment with each of the plurality of discrete storage locations; and a collimator operably coupled with the gamma ray energy detector for substantially limiting acceptance of gamma-ray energy by the gamma-ray energy detector to gamma-ray energy emitted from a discrete storage location substantially in longitudinal alignment therewith.

10. The apparatus of claim 9, wherein the gamma-ray energy detector is configured to produce an electrical output responsive to acceptance of emitted gamma-ray energy, and wherein the apparatus further comprises:

a multichannel analyzer electrically coupled with the gamma-ray energy detector for generating a gamma-ray spectrum corresponding to gamma-ray energy accepted by the gamma-ray energy detector; and a gamma-ray spectrum analyzer electrically coupled with the multichannel analyzer for determining a presence or an absence of a nuclear fuel source at a storage location responsive to a gamma-ray spectrum generated in association therewith.

11. The apparatus of claim 10, wherein each of the discrete storage locations has a centerline, and wherein the centerlines are mutually parallel, the collimator is in substantially parallel alignment with the centerlines of the discrete storage locations and the drive assembly is adapted to position the collimator in substantially coaxial alignment relative to the centerline of each of the discrete storage locations.

12. The apparatus of claim 11, wherein the drive assembly is adapted to coaxially position the gamma-ray energy detector at each of the respective discrete storage locations for a time period sufficient for the generation of a gamma-ray spectrum for each of the respective discrete storage locations.

13. The apparatus of claim 12, wherein the nuclear fuel sources include a plurality of fission products, and wherein the gamma-ray spectrum analyzer is adapted to identify the presence or the absence of a nuclear fuel source by identifying a predetermined peak-to-Compton ratio of the fission products gamma-rays from each of the respective gamma-ray spectra.

14. The apparatus of claim 13, wherein a high peak-to-Compton ratio indicates the presence of the nuclear fuel source at a discrete storage location, and wherein a low peak-to-Compton ratio indicates the absence of the nuclear fuel source at a discrete storage location.

15. A method for inspecting a sealed storage container having a plurality of nuclear fuel sources disposed therein, the method comprising:

providing a sealed storage container having an internal cavity in which is disposed a plurality of nuclear fuel sources in a plurality of predetermined, laterally spaced storage locations;

positioning a gamma-ray energy detector in superimposition over an end of the sealed storage container, and moving the gamma-ray energy detector, in turn, into substantial alignment relative to each of the storage locations;

collimating gamma-ray energy accepted by the gamma-ray energy detector at each among the plurality of storage locations from the end of the sealed storage container to substantially exclude gamma-ray energy emitted from others among the plurality of storage locations;

generating a gamma-ray spectrum for each of the storage locations of the storage container from an output of the gamma-ray energy detector; and analyzing each of the gamma-ray spectra to determine a presence or an absence of a nuclear fuel source at each of the storage locations of the sealed storage container.

16. The method of claim 15, wherein each storage location has a centerline, and wherein moving the gamma-ray energy detector into substantial alignment relative to each of the storage locations further comprises orienting the gamma-ray energy detector in substantially coaxial alignment relative to the centerline of each of the storage locations.

17. The method of claim 15, further comprising:

using a collective gamma-ray spectrum associated with the nuclear fuel sources within the sealed storage container to identify the sealed storage container.

18. The method of claim 15, further comprising:

maintaining the gamma-ray energy detector for a time period at each storage location sufficient for generation of the gamma-ray spectrum.

19. The method of claim 15, wherein analyzing each of the gamma-ray spectra further comprises:

identifying a predetermined peak-to-Compton ratio in each of the spectra, which ratio indicates the presence or the absence of the nuclear fuel source at each of the storage locations.

20. A method for inspecting a sealed storage container having a plurality of nuclear fuel sources disposed therein, comprising:

providing a sealed storage container having an internal cavity including a plurality of spaced storage positions for receiving individual nuclear fuel sources, and wherein the nuclear fuel sources generate gamma-ray radiation;

providing a frame adjacent and extending over an end of the sealed storage container;

supporting a selectively movable gantry on the frame over the end of the sealed storage container;

mounting a gamma-ray energy detector on the movable gantry, and orienting the gamma-ray energy detector vertically and toward the end of the sealed container;

selectively moving the gamma-ray energy detector horizontally along the moveable gantry and the moveable gantry along the frame using a drive assembly operably coupled to a controller to position the gamma-ray energy detector in substantial longitudinal alignment with each of the storage positions;

using a collimator to substantially exclude from detection by the gamma-ray energy detector, gamma-ray energy other than gamma-ray energy emitted from a location substantially longitudinally aligned with the gamma ray energy detector;

coupling a multichannel analyzer to an output of the gamma-ray energy detector and generating a gamma-ray spectrum with the multichannel analyzer responsive to the output of the gamma-ray energy detector for each of the storage locations of the sealed nuclear storage container; and confirming a presence or an absence of a nuclear fuel source at each of the storage locations from a gamma-ray spectrum associated therewith using a gamma-ray spectrum analyzer.

21. A method for tracking spent fuel bundles, comprising:

providing a sealed storage container having an internal cavity which encloses a plurality of spent fuel bundles, each spent fuel bundle being disposed at a discrete storage location laterally spaced from a discrete storage location of any other spent fuel bundle;

positioning a gamma-ray energy detector in superimposition over an end of the storage container, relative to each of the discrete storage locations for detection of gamma-ray energy substantially only from a single discrete storage location at a time;

generating a gamma-ray spectrum associated with each of the discrete storage locations of the nuclear storage container from an output of the gamma-ray energy detector;

correcting various gamma peak intensities for radioactive decay; and comparing each of the generated gamma-ray spectra after correction of various gamma peak intensities thereof to a known gamma-ray spectra for a spent fuel bundle at each discrete storage location to verify a presence and identity of the spent fuel bundle.

* * * * *

UNITED STATES PATENT AND TRADEMARK OFFICE
CERTIFICATE OF CORRECTION

PATENT NO. : 7,514,695 B2  
APPLICATION NO. : 11/535084  
DATED : April 7, 2009  
INVENTOR(S) : Augustine J. Caffrey It is certified that error appears in the above-identified patent and that said Letters Patent is hereby corrected as shown below:

On the title page:
After ITEM [65] Prior Publication Data  create new item --(62) Related U.S. Application Data Related Application No. 11/379,888, filed Apr. 24, 2006.--

In ITEM [56] References Cited
    U.S. PATENT DOCUMENTS
    Page 1, 2$^{nd}$ column, (line 3),    after entry beginning "5,638,420", create new entry --5,661,768 A * 8/1997 Gilligan, III et al.--

In the specification:
    COLUMN 1, LINE 5,    before "GOVERNMENT RIGHTS" insert
--CROSS-REFERENCE TO RELATED APPLICATIONS
This application is related to application Ser. No. 11/379,888, filed Apr. 24, 2006, entitled APPARATUS AND METHOD FOR INSPECTING A SEALED CONTAINER," pending.--
    COLUMN 1, LINES 12-18,    delete
"CROSS-REFERENCE TO RELATED APPLICATIONS
This application is related to application Ser. No. 11/379,888, filed Apr. 24, 2006, entitled APPARATUS AND METHOD FOR INSPECTING A SEALED CONTAINER," pending."
    COLUMN 4, LINE 24-25,    delete line break after "11." and before "The plurality"
    COLUMN 4, LINE 32-33,    delete line break after "thereto." and before "The rack"
    COLUMN 4, LINE 63-64,    delete line break after "61." and before "The first"
    COLUMN 9, LINE 4-5,    delete line break after "20." and before "Still further,"
    COLUMN 9, LINE 9,    change "respectively which" to --which--

Signed and Sealed this
Sixth Day of August, 2013

Teresa Stanek Rea
*Acting Director of the United States Patent and Trademark Office*

CERTIFICATE OF CORRECTION (continued)
U.S. Pat. No. 7,514,695 B2

In the claims:

| | | | |
|---|---|---|---|
| CLAIM 5, | COLUMN 10, | LINE 41, | change "4" to --4,-- |
| CLAIM 9, | COLUMN 11, | LINE 4-5, | delete line break after "by" and before "a nuclear fuel" |